United States Patent Office 3,546,230
Patented Dec. 8, 1970

3,546,230
VINYL ESTER AMIDE OF PINIC ACID
Glen W. Hedrick, 2921 Inglewood Ave., Lake City, Fla. 32055, and Frank C. Magne, 2223 Franklin Ave., New Orleans, La. 70117
No Drawing. Original application June 30, 1967, Ser. No. 647,343. Divided and this application Aug. 6, 1969, Ser. No. 870,849
Int. Cl. C07d 29/24
U.S. Cl. 260—294.3
1 Claim

ABSTRACT OF THE DISCLOSURE

This invention relates to some vinyl ester amides of pinic acid, methods for preparing same and to certain copolymers thereof. More particularly, this invention relates to the preparation of vinyl 2,2-dimethyl-3-morpholinocarbonylcyclobutane acetate, vinyl 2,2-dimethyl-3-piperidinocarbonylcyclobutane acetate, and vinyl 2,2-dimethyl-3-di-n-butylaminocarbonylcyclobutane acetate by selective amination followed by vinyl interchange and the preparation of several vinyl chloride copolymers derived therefrom.

---

This application is a division of Ser. No. 647,343, filed June 30, 1967.

A non-exclusive, irrevocable, royalty-free license in the invention herein described, throughout the world for all purposes of the United States Government, with the power to grant sublicenses for such purposes, is hereby granted to the Government of the United States of America.

A primary object of the present invention is to provide methods for preparing at will some vinyl ester amides of pinic acid. A further object of this invention is to provide methods for preparing vinyl chloride copolymers from these ester amides.

Polyvinyl chloride is plasticized by pinic diesters (Loeblich, V. M., Magne, F. C., and Mod, R. R., Ind. Eng. Chem., 47, 855 (1955) and Coyne, R. F., and Yehle, E. A., Ind. Eng. Chem., 47, 553 (1955)), but copolymers of vinyl chloride with various isomeric pinic acid esters (I and II).

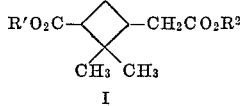 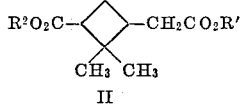

I II (where R'=—CH=CH$_2$ and R$^2$=—C$_2$H$_5$, n—C$_4$H$_9$ or CH$_2$—CH(CH$_2$)$_3$(CH$_3$), did not exhibit internal plasticization by the vinyl ester incorporated in the polymer backbone (Marvel, C. S., Shimura, Y., and Magne, F. C., J. Polymer Sci., 45, 13 (1960)).

Since amides are often good plasticizers of polyvinyl chloride, the vinyl ester-amides of pinic acid, III, where the amine moiety is morpholine (a), piperidine (b), or di-n-butylamine (c), were prepared.

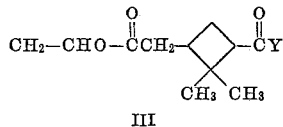

III

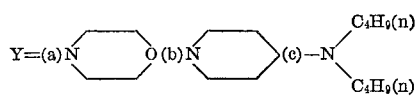

Copolymers containing approximately 15 and 30 weight percent of the vinyl ester-amide were prepared to examine the ability of these comonomers to act as internal plasticizers for the polymers.

The vinyl esters of 2,2-dimethyl-3-alkylaminocarbonylcyclobutane acetic acid were prepared by reacting the following amino morpholine, piperidine and di-n-butyl amine with ethyl 2,2-dimethyl-3-chlorocarbonylcyclobutane acetate, by hydrolyzing the ethyl ester to the free acid and vinylating the resulting monoamides by vinyl interchange. Results are shown in Table I.

The vinyl chloride copolymers containing approximately 25 and 30 weight percent of the vinyl ester-amide were prepared in an emulsion system at 60° C. using ORR soap as the emulsifying agent and potassium persulfate as the initiator. The copolymers were reprecipitated 15 times from tetrahydrofuran into water and 3 times into methanol before analysis.

The evaluations of the copolymers obtained on specimens die-cut from 37–54 mil thick sheets prepared by casting on a confined mercury surface, a tetrahydrofuran solution containing 15 grams of the respective copolymers, 0.075 gram of stearic acid and 0.15 gram of "Advastab T–360" stabilizer (a polymeric tin mercaptide—Advance Division, Carlisle Chemical Works). After setting for 48 hours at room temperature to allow the bulk of the solvent to evaporate, the sheets were stripped from the mercury surface and aged for 24 hours at room temperature. They were then heated in a forced draft oven for 12 hours at 65° C. followed by another aging at room temperature for 30 days to desolventize the film. The copolymers were then tested for tensile strength, modulus of elasticity, yield point and elongation measurements were made in conformance with ASTM Test DC38 for rigid and semi-rigid conditions, except for the use of 1-inch gauge length rather than the 2 inches called for in the test. Torsional stiffness measurements were made in conformance to ASTM Test 1043–61T. The results of these tests are shown in Table III.

EXAMPLE 1

The acid chloride, B.P. 114° C., 2 mm., of monoethyl pinate, was prepared by reacting thionyl chloride with the monoester obtained by esterification of pinic acid with one mole of ethanol (Lewis, J. B., and Hedrick, G. W., J. Org. Chem., 24, 1870 (1959)). The pinic acid was obtained from hypochlorite oxidation of cis-dl-pinonic acid. Gas chromatographic analyses of esters of the pinic acid gave two peaks which presumably resulted from the expected cis and trans isomers of the acid.

EXAMPLE 2

Morpholine, 370 g. (4.35 moles) dissolved in 1 liter of dry benzene was heated to reflux. The acid chloride above was added dropwise at a rate to maintain a gentle boil. When cooled to room temperature, morpholine hydrochloride, insoluble in benzene, was removed by filtration and washed with benzene. After the solvent was removed under reduced pressure, the product was distilled. The yield was 444 g. of a liquid.

EXAMPLE 3

The amide above, 283 g. (1 mole), was dissolved in 300 ml. of 95% ethanol and saponified by the addition of 40 g. of sodium hydroxide dissolved in 100 ml. of water. The temperature rose to 50° C. and after 4 hours the pH dropped to about 8. After 16 hours the batch was diluted with 169 ml. of water, the alcohol removed by distillation using a packed column and the residue diluted further with 422 ml. of water. Extraction of the alkaline solution with chloroform gave 0.5 g. of starting material. Acidification, extraction with chloroform and isolation by removal of solvent at 0.5 mm., 125° C. pot temperature gave 261 g. of waxy solid. Five grams crude washed with diethyl ether gave 3 g. of colorless liquid, presumably the cis isomer since it was present in the greater amount.

TABLE I.—VINYL ESTERS OF AMIDES OF PINIC ACID

| Vinyl 2,2-dimethyl-3-aminocarbonyl-cyclobutane-acetate | M.P. °C. | B.P. °C. | mm. Hg | Yield percent | Refractive index $n_D^{20}$ | Hydrogenation equivalent | | Formula | Composition, percent | | | | | |
|---|---|---|---|---|---|---|---|---|---|---|---|---|---|---|
| | | | | | | | | | Calcified | | | Found | | |
| | | | | | | Calc'd | Found | | C | H | N | C | H | N |
| Morpholinocarbonyl | | | | | | | | | | | | | | |
| Piperidinocarbonyl | a 75 | 185 | 6.2 | 81 | 1.5018 | 281.34 | 280.92 | $C_{15}H_{23}O_4N$ | 64.03 | 8.24 | 4.98 | 63.93 | 8.20 | 4.86 |
| Di-a-butylamino-carbonyl | (b) | 146–148 | 6.18 | 53 | 1.5007 | 279.37 | 280.49 | $C_{16}H_{25}O_3N$ | 68.78 | 9.02 | 5.01 | 68.90 | 9.10 | 5.05 |
| | Liq.(b) | 150–152 | 0.25 | 78.2 | 1.4765 | 323.45 | 322.16 | $C_{19}H_{37}O_3N$ | 70.53 | 10.29 | 4.33 | 70.70 | 10.18 | 4.51 | a From ether-pentane, 2:1.
b Liquid.

EXAMPLE 4

The crude half amide above was vinylated by the vinyl interchange procedure of Adelman (Adelman, R. L., J. Org. Chem., 04, 1057 (1949)). The crude amide was melted and added in a molten state to the vinyl acetate. After adding catalyst and standing awhile, crystallization of one of the half amides, presumably the cis isomer occurred. After about 72 hours, the solid, about one-third of the charge, was removed by filtration. The vinyl ester (filtrate) was isolated by the usual procedure which involved stripping excess vinyl acetate in vacuo, washing with dilute sulfuric acid, 0.1 to 0.5 N, then water, drying over sodium sulfate and distilling. The recovered acid was reacted with more vinyl acetate and converted to vinyl ester.

EXAMPLE 5

The piperidine derivative was prepared as in Example 2 except piperidine was used in place of morpholine. The ethyl ester was then hydrolyzed to the free acid in Example 3 and the monoamide was vinylated by the vinyl interchange procedure as in Example 4.

EXAMPLE 6

The di-n-butyl amine derivative was prepared as in Example 2 except di-n-butyl amine was used in place of morpholine. The ethyl ester was then hydrolyzed to the free acid as in Example 3 and the monoamide vinylated by the vinyl interchange procedure as in Example 4.

EXAMPLE 7

The vinyl chloride copolymers containing 25 and 30 weight percent of vinyl 2,2-dimethyl-3-morpholinocarbonylcyclobutane acetate, vinyl 2,2-dimethyl-3-piperidinocarbonylcyclobutane acetate and vinyl 2,2-dimethyl-3-di-n-butylaminocarbonylcyclobutane acetate were prepared in the following manner:

Each evaluation sample was obtained by combining 10–15 individual polymerization batches during the reprecipitation procedure. Each individual polymerization contained a starting charge of 10 g. of monomers (2.5 g. and 7.5 g. or 3.0 g. and 7.0 g. of the vinyl ester-amide and vinyl chloride, respectively). To a 110 ml. polymerization tube (Ace Glass T1506) was added the approximate amount of vinyl ester-amide, 0.6 g. of ORR soap, 4.0 ml. of a 2.5% potassium persulfate solution and 43 ml. of deoxygenated water. The vinyl 2,2-dimethyl-3-morpholinocarbonylcyclobutane acetate copolymers were prepared using Triton X-301 (Rohm & Haas), a 20% solution of an alkylaryl sulfonate and 40 ml. of water. The tube was cooled in a Dry Ice-acetone bath and a slight excess of condensed vinyl chloride was added. The tube was capped with a crown type bottle top after the excess vinyl chloride was evaporated.

The ORR soap mentioned above is a silicate free and linoleic acid linolinic acid free soap used in the production of ORS rubber.

The polymerization tubes were placed in a constant temperature tumbler batch for 72 hours at 60° C. The copolymer emulsions were coagulated by pouring into 400 ml. of a saturated salt solution. The copolymer batch was filtered, washed two times with water and two times with methanol. The copolymer was dissolved in tetrahydrofuran (10% solution) and reprecipitated a total of 15 times into water and 2 times into methanol.

A one gallon Waring Blendor was used for the reprecipitation into water. The rate of agitation was about 7000 r.p.m. The methanol was stirred with a spatula during the reprecipitations. The copolymers precipitated in fibrous stands during the reprecipitation into water and methanol under the conditions described.

The copolymers were dried in air for 72 hours and in a vacuum oven at room temperature for 24 hours. The copolymer data are listed in Table II.

TABLE II.—EMULSION COPOLYMERIZATION OF VINYL CHLORIDE AND VINYL ESTER-AMIDES AT 60° C. FOR 72 HOURS

| Vinyl ester (sample number) a | Monomer charge of each batch b (wt. percent of vinyl ester-amide) | Emulsifier, g. | Water, ml. | Conversion, c, percent | Softening Temperature, d °C. | Anal., e N% | $N_{inh}$, f | Weight percent of amide-ester in copolymer g |
|---|---|---|---|---|---|---|---|---|
| Vinyl 2,2-dimethyl-3-morpholinocarbonyl-cyclobutane acetate: | | | | | | | | |
| 1 | 25 | Triton X-301 (3.0) | 40 | 80 | 95 | 1.33 | 0.85 | 26.6 |
| 2 | 25 | ORR soap (0.5) | 43 | 82 | 91 | 1.37 | 0.99 | 27.4 |
| 3 | 30 | Triton X-301 (3.0) | 40 | 78 | 90 | 1.11 | 0.79 | 22.2 |
| 4 | 30 | ORR soap (0.5) | 43 | 76 | | 1.25 | 0.96 | 19.0 |
| Vinyl 2,2-dimethyl-3-piperidinocarbonyl-cyclobutane acetate: | | | | | | | | |
| 1 | 25 | ORR soap (0.5) | 43 | 82 | 90 | 1.29 | 1.15 | 23.5 |
| 2 | 30 | ORR soap (0.6) | 45 | 79 | 90 | 1.14 | 1.30 | 22.9 |
| Vinyl 2,2-dimethyl-3-di-n-butylaminocarbonyl-cyclobutane acetate: | | | | | | | | |
| 1 | 25 | ORR soap (0.5) | 43 | 75 | 80 | 1.18 | 1.28 | 26.4 |
| 2 | 25 | ORR soap (0.5) | 43 | 84 | 95 | 1.09 | 1.34 | 23.7 |
| 3 | 30 | ORR soap (0.5) | 43 | 78 | 94 | 1.35 | 1.34 | 30.1 | a Each polymer sample is a composite of 10–15 individual polymerization batches.
b Each polymerization batch contained 10 g. of monomer in the ratio shown.
c Average conversion of all batches after 2 reprecipitations into water.
d The temperature at which the polymer begins to flow when heated between two cover glasses.
e Average of two determinations.
f Inherent viscosity of a 0.2% tetrahydrofuran solution measured at 30° C. in a No. 50 Cannon-Fenska viscometer.
g Calculated from the nitrogen content of the copolymer.

TABLE III.—PHYSICAL CHARACTERISTICS OF SOME POLY (VINYL ESTER-AMIDE–VINYL CHLORIDE) COPOLYMERS

| Sample Number | Vinyl ester-amide comonomer in polymer | Percent Ester-amide on N₂ basis | Relative modulus of elasticity, p.s.i. | Yield point, p.s.i. | Tensile strength, p.s.i. | Elongation, percent | $T_i$ °C. | $T_4$ °C. |
|---|---|---|---|---|---|---|---|---|
| 1 | Vinyl 2,2-dimethyl-3-morpholino-carbonylcyclobutane acetate | 26.6 | 57,400 | 2,000 | 1,330 | 90 | +10 | +22 |
| 2 | | 27.4 | 34,200 | 1,290 | 1,230 | 120 | +17 | +24 |
| 3 | | 22.2 | 62,300 | 2,470 | 1,630 | 15 | −5 | +7 |
| 1 | Vinyl 2,2-dimethyl-3-piperidino-carbonylcyclobutane acetate | 25.5 | 49,500 | 1,800 | 1,180 | 60 | +10 | +22 |
| 2 | | 22.9 | 41,300 | 1,604 | 1,060 | 80 | +7 | +16 |
| 1 | Vinyl 2,2-dimethyl-3-di-n-butyl-aminocarbonylcyclobutane acetate | 26.4 | 30,700 | 1,330 | 1,200 | 100 | +11 | +21 |
| 2 | | 23.7 | 88,400 | 3,030 | 3,500 | 10 | +14 | +26 |
| 3 | | 30.1 | 32,900 | 1,830 | 1,160 | 90 | +14 | +22 |
| | Poly (vinyl chloride-vinyl acetate) copolymer | None | ---- | 7,700 | 6,830 | 128 | +75 | ---- |
| | Ditto +35% di-2-ethylhexyl phthalate | None | a 1,600 | ---- | 3,050 | 350 | −24 | −3 | a P.s.i. at 100% elongation.

We claim:
1. A compound represented by the formula:

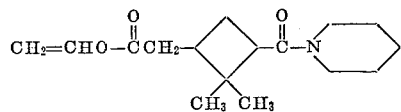

References Cited

Griffith et al., J. of Polymer Science: Part A–1, vol. 4, 1993–2002 (1966), p. 1993 relied upon.

HENRY R. JILES, Primary Examiner

G. T. TODD, Assistant Examiner

U.S. Cl. X.R.

260—86.3, 247.2, 468, 899